(12) United States Patent
Frantz et al.

(10) Patent No.: US 6,757,725 B1
(45) Date of Patent: Jun. 29, 2004

(54) SHARING AN ETHERNET NIC BETWEEN TWO SUB-SYSTEMS

(75) Inventors: Christopher Frantz, Houston, TX (US); E. David Neufeld, Magnolia, TX (US); Kenneth C. Avery, Houston, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/544,574

(22) Filed: Apr. 6, 2000

(51) Int. Cl.⁷ .............................................. G06F 15/173
(52) U.S. Cl. ...................... 709/223; 709/224; 709/225; 709/226; 709/229; 709/250; 370/200; 370/217; 370/466
(58) Field of Search ........................ 714/2–10; 370/217, 370/200, 466; 709/250

(56) References Cited

U.S. PATENT DOCUMENTS

| | | | | |
|---|---|---|---|---|
| 5,710,908 A | * | 1/1998 | Man ........................... | 709/230 |
| 5,787,253 A | * | 7/1998 | McCreery et al. .......... | 709/231 |
| H1801 H | * | 9/1999 | Browning et al. ............. | 379/9 |
| 6,148,344 A | * | 11/2000 | Bi ............................... | 709/250 |
| 6,253,271 B1 | * | 6/2001 | Ram et al. ................... | 710/306 |
| 6,314,525 B1 | * | 11/2001 | Mahalingham et al. ........ | 714/4 |
| 6,400,730 B1 | * | 6/2002 | Latif et al. ................... | 370/466 |
| 6,470,013 B1 | * | 10/2002 | Barach et al. .............. | 370/392 |

* cited by examiner

Primary Examiner—Hosain Alam
Assistant Examiner—Shabana Qureshi

(57) ABSTRACT

A management sub-system is associated with a host computer system. The host system includes a network interface controller to facilitate transmissions between the host system and a distributed computer network. In addition, the management sub-system and host computer share an Ethernet network interface controller (NIC), which is assigned at least two different addresses. The management NIC includes decode logic that detects either of the addresses assigned to it, and routes the associated data packet to the management processor, or to the host processor. As a result, all management operations to either the management sub-system or the host system may be routed through the management NIC, while other standard operations may be routed through the host NIC. In addition, the management NIC may be used as a back-up or spare for the host NIC in the event it fails, or becomes overly busy.

22 Claims, 2 Drawing Sheets

SHARING AN ETHERNET NIC BETWEEN TWO SUB-SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to network interface controllers (NICs) for coupling a computer system to a local area network (LAN). More particularly, the invention relates to a management system that monitors the performance and failure of an associated computer or server. Still more particularly, the present invention relates to a management system that shares an Ethernet NIC with the computer system it manages.

2. Background of the Invention

Distributed computer networks such as LAN's (local area networks) have become one of the most important devices for storing and sharing data in a business, and thus, computer networks are one of the most critical pieces of equipment in a business office. Computer networks typically comprise a plurality of personal computers and other data processing devices connected together for information exchange. At the heart of the computer network is one or more file servers. In most computer networks, file servers are responsible for administrating and storing the documents generated by each of the personal computers (PC's) in the system. Needless to say, a failure in the computer network can cause business operations to grind to a halt. In addition to managing the network, file servers also preferably include the capability to monitor faults in the computer network. If a fault or security breach is detected, the file server provides a warning of the fault and in certain instances may also provide diagnostic operations and may even implement corrective measures.

Servers typically connect to the network through a network interface controller (NIC). The NIC typically connects to a system bus (such as the PCI bus or EISA bus) within the server. The NIC also usually couples, via a suitable cable, to the network (such as an Ethernet bus), which is a set of wires that link together all of the computers, printers and all other peripheral resources available via the network. If a server's NIC fails, access to the server is no longer available, and the server is no longer capable of transmitting data or instructions to the network.

Because of the relative importance of servers to a business, there has been a trend recently to provide a management sub-system with servers. These management sub-systems may be provided as part of the server itself, may be inserted as expansion cards in the server expansion bay, or may comprise a separate "stand-alone" unit that connects electrically to the server. Regardless of how implemented, the management sub-systems typically are designed to monitor the operation of certain aspects of the server, and if necessary, to repair or reboot the server in the event of failure. Many management sub-systems contact a systems administrator if an error is detected that cannot be repaired. Some management sub-systems may even take over certain critical operations of the server until it has been repaired.

If implemented as part of a "dedicated" management network, the management sub-system usually includes a separate network interface controller (NIC). This NIC couples the management system to a management console, either via the network, or through a modem connection on the network. Oftentimes, the management sub-system is linked to the management console via a secure connection that is limited for use by the system administrator for administration and management operations. Thus, typically, both the management sub-system and the server are on separate networks and have separate network interface controllers, with different MAC addresses.

It would be advantageous if the server system and management sub-system could share a NIC for certain functions. In particular, it would be desirable to use a NIC to interface both the management sub-system and the server to the management console to provide the system administrator with a secure connection to both the management sub-system and the server. Thus, in addition to communicating with the management sub-system via the management NIC, other management operations involving the server also could be performed using the management NIC. These operations include, but are not limited to, server health agents, file sharing and application performance reporting. Such a system would permit management functions on the network to be isolated from normal data storage and retrieval functions. Alternatively, if the server NIC and management sub system NIC are located on the same network, it would be desirable if the management sub-system NIC could also function as a back-up NIC for the server in the event that the server NIC fails.

BRIEF SUMMARY OF THE INVENTION

The problems noted above are solved in large part by a system that includes a management sub-system that is associated with a host server computer system such as a server, for managing and monitoring the host system. Both the host system and the management sub-system include a network interface controller (NIC) capable of interfacing with the network, which may comprise a Local Area Network (LAN) implemented with an Ethernet link. In the preferred embodiment, the host computer also couples through the management NIC, to permit all management operations to be consolidated through a common, secure network interface controller. In addition, the system may be configured so that the host system can use the management NIC in the event that the host NIC fails.

In the preferred embodiment, the system management sub-system couples to a system bus of the host computer system. The management sub-system includes a management processor and associated software, including management software and a management NIC. The management NIC includes modified packet decode logic that accepts addresses to both the management sub-system and to the host computer system. If the destination address of the packet targets the management sub-system, the packet data is routed to the management processor by a software multiplexer/demultiplexer. If, conversely, the destination address targets the server, the data is routed to the server by the multiplexer/demultiplexer.

According to the preferred embodiment, all management operations relating to the host system are routed through the management NIC. Other normal data transactions to the host system are routed through that system's NIC, thus isolating management operations from standard data operations. In the event the host NIC fails, all outgoing data packets from the host system may be re-routed by the host processor through the management NIC if the host NIC and management NIC are on the same network. Moreover, the management NIC may be used in situations where the host NIC becomes overly busy and is unable to process pending network transactions to and from the host computer.

BRIEF DESCRIPTION OF THE DRAWINGS

For a detailed description of the preferred embodiments of the invention, reference will now be made to the accompanying drawings in which:

FIG. 3 shows a standard Ethernet packet that is transmitted and received by the management NIC, in accordance with the preferred embodiment.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The term "host system" or "host computer system" means a computer that has an associated management sub-system. The term "computer" is used in this specification broadly and includes a personal computer, workstation, server, or other microprocessor-based device which can be programmed by a user to perform one or more functions and/or operations. The term "network" is meant to encompass any distributed computer system, whether local (a LAN), wide area (a WAN), or other, and may be implemented using an Ethernet connection, or any other suitable link.

DESCRIPTION OF THE PREFERRED EMBODIMENTS

Figure 1:
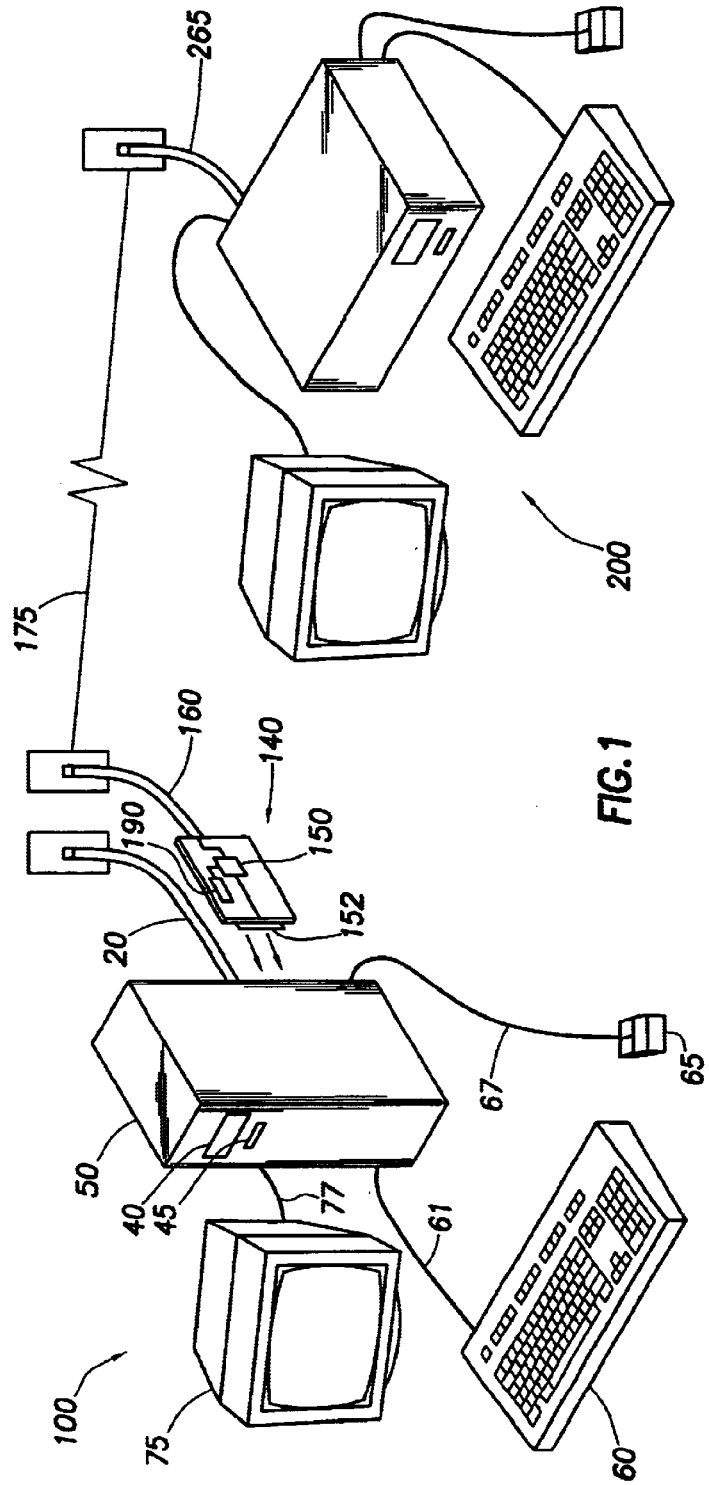
FIG. 1 shows a host system with a management sub-system coupled to a management console in accordance with the preferred embodiment of the present invention.

Referring initially to FIG. 1, the host computer system constructed in accordance with the preferred embodiment comprises a host computer server or personal computer 100 and a management sub-system 140, both of which include network interface controllers (NICs) for coupling to the network 175. A management console 200 couples to the management sub-system 140 and host computer 100 via the network 175.

The host computer system 100 constructed in accordance with a preferred embodiment of the invention generally comprises a computer chassis 50, a computer monitor 75, a keyboard 60 and a mouse 65. The chassis 50 may house various electrical components that perform the computing functions of the computer. In accordance with normal convention, the chassis 50 houses a CD-ROM drive 40 and a floppy disk drive 45. Various other drives may also be included in chassis 50, including for example, DVD-ROM drives, ZIP drives, and PCMCIA slots/drives. These drives permit removable storage media to be inserted in appropriate receptacles, where the data stored on the media may be read by appropriate hardware and software in the computer.

The input devices, which in most instances comprises the keyboard 60 and mouse 65, connect via cables 61, 67, respectively to appropriate ports or connectors on the chassis 50 to permit the user to input instructions to the computer. Other input devices may also be provided in addition to, or in place of, those shown. In addition, the input devices may be coupled to the computer using a wireless media, such as infrared transmissions. The computer monitor 75 may be separate from the chassis 50, or may be integral with the chassis, depending upon the desired configuration of the computer system. If separate from the chassis, a suitable cable 77 couples the monitor to the electronics in the chassis.

In the preferred embodiment, the computer system 100 comprises a server that couples via a suitable network connection to one or more personal computers. The server stores files and data on behalf of the network computers, and facilitates the interconnection and access of information by computers in the network. Thus, in accordance with normal convention, computer system 100 couples via an Ethernet cable 20 to one or more computers or servers in a local area network (LAN).

Referring still to FIG. 1, the management sub-system 140 preferably comprises a computer card that may be physically inserted into the chassis 50 of the computer system 100, as shown by the arrows in FIG. 1. Alternatively, the management sub-system may comprise a housing that is configured separately from the chassis 50, and connected by suitable connections to the computer system 100, as will be explained in more detail below. As yet another alternative, the management sub-system may be provided on a circuit board or a system board physically located within the chassis of the computer system 100. In the preferred embodiment, the management sub-system 150 connects via connectors 152 on the edge of the card to a system bus in the computer system 100, such as, for example, a PCI (Peripheral Component Interconnect) bus or EISA (Extended Industry Standard Architecture) bus. As shown in FIG. 1, the management sub-system preferably couples to an Ethernet line or to some other suitable network connection via cable 160. Preferably, cable 160 couples the management sub-system 150 to the network link 175. If desired, the network link 175 may include a telephone line or other suitable communication line, such as an ISDN line or DSL line, to permit remote communication to the management console 200, which may be located remotely from the local area network. Thus, the management sub-system 140 may communicate with the management console 200, which may be located either on the network or at a location remote from the network. One skilled in the art will appreciate that other network circuitry and connections in the form of routers, hubs, modems and the like may be used to implement the network link 175 to the management console 200. For the sake of simplicity, these additional components have been omitted in FIG. 1.

Referring still to FIG. 1, the management console 200 couples to the communication line 175 via a suitable link 265. As noted above, the communication line 175 may comprise a network line, a telephone line, ISDN, DSL, or other communication link, an Internet connection, or a combination of one or more of these. The management console 200 preferably comprises a standard personal computer system or server that couples either directly or indirectly to the computer network 175.

Figure 2:
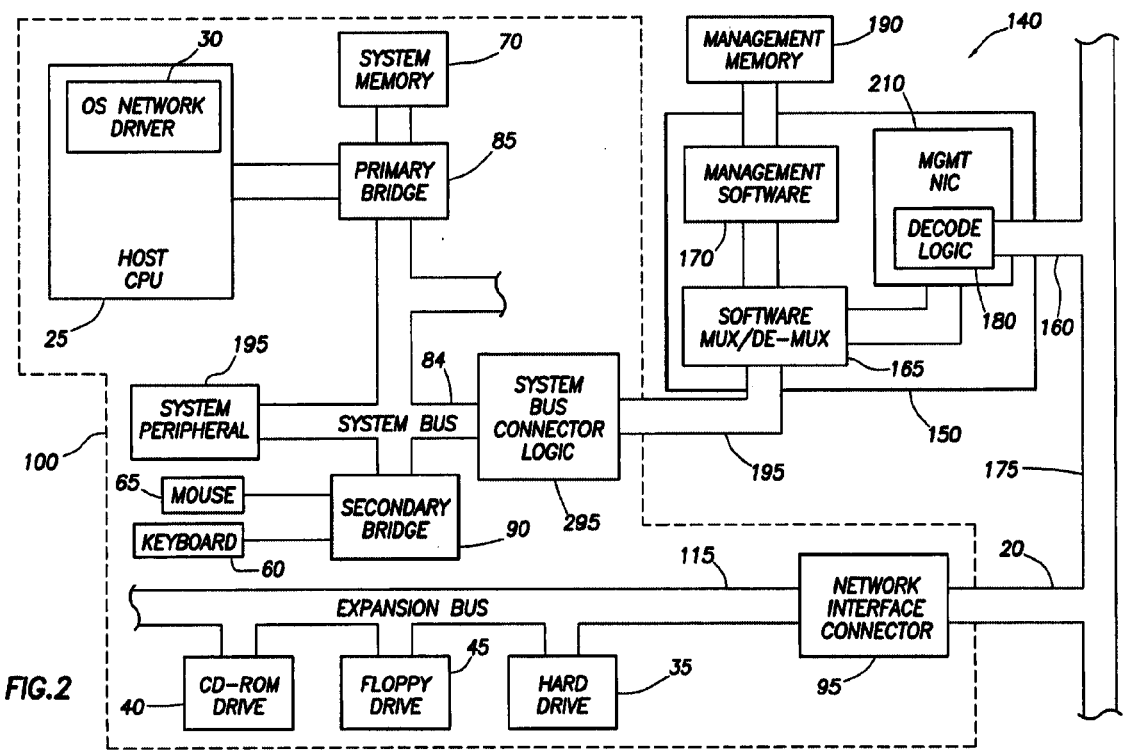
FIG. 2 is a block diagram of the preferred host system and management sub-system of FIG. 1 in greater detail.

Referring now to FIG. 2, the host computer system 100 and management sub-system 140 are shown in more detail. Thus, as seen in FIGS. 1 and 2, the host computer system 100 preferably is configured with a standard computer architecture, and thus includes a processor 25, system memory 70, bus bridges 85, 90, and various data storage drives 35, 40, and 45. The host processor 25 preferably couples to system memory 70 through a primary bridge device 85, although the processor may couple to the system memory directly via a local bus, or through any alternative arrangement. It should also be understood that other embodiments of the invention may include more than one processor or CPU. The processor 25 may comprise any microprocessor capable of serving as the "brains" of a computer system, such as the Pentium II®, Pentium III®, or Celeron® processor by Intel®, the Athlon® processor by AMD, or other microprocessors from these or other manufacturers that may be used or configured for use in a computer system. In accordance with normal convention, the host processor 25 executes OS (operating system) network driver software 30 that coordinates transmissions to and from the network.

The system memory 70 preferably comprises one or more memory devices that function as the working memory of the computer system. System memory may comprise, for example, synchronous dynamic random access memory ("SDRAM"), or other memory designs suitable for use in a computer. Other memory devices also may be provided for more permanent storage, such as read-only memory (ROM). The primary bridge 85 permits the processor 25 and other devices in computer system 100 to read data from or write data to system memory 70. Although not shown in FIG. 2, the primary bridge 85 may include an advanced graphics port (AGP) to support a graphics accelerator or other graphics devices (including a monitor) or memories that reside on an AGP bus.

The primary bridge 85 also preferably includes an interface to a system or peripheral bus 84. In the preferred embodiment, the system bus 84 comprises a Peripheral Component Interconnect ("PCI") bus, to which the primary bridge 85 interfaces. Various system bus compliant peripheral devices 195 may connect to the system bus 84. Through primary bridge 85, the processor 25 can communicate with various system devices, such as the peripheral device 195, and other devices connected to the system bus 84, including the secondary bridge 90. In accordance with the protocol of various system busses, such as the PCI bus, various PCI bus masters may read data from and write data to system memory 70 via the primary bridge 85. The bridge 85 preferably contains a memory controller and arbiter (not specifically shown) to provide controlled and efficient access to system memory 70 by the various devices in computer system 100 such as processor 25 and other system devices. Alternatively, a separate memory controller may be provided that couples to the bridge 85.

Computer system 100 preferably also includes a secondary bridge device 90 which bridges the system bus 84 to one or more expansion buses 115, such as an Extended Industry Architecture ("EISA") bus, Industry Standard Architecture ("ISA") bus, sub-ISA bus, or X bus. Other devices, such as a hard disk drive 35, CD-ROM drive 40, and floppy drive 45, couple to secondary bridge device 90, preferably via the expansion bus 115. Other drives may also be provided is desired. Drives 35, 40, and 45 can be accessed by the processor 25 through the primary bridge 85 and secondary bridge 90. One of ordinary skill in the art will recognize that one or more disk drive controllers (not shown) may also be included to provide effective data transfers to and from these drives. Similarly, the keyboard 60 and mouse 65 also preferably connect to the secondary bridge 90, which relays input signals from a local user to the processor 25. One or more suitable bus connectors or slots 295 preferably connect to the system bus 84 to permit other compatible peripheral devices to be added to the system if desired.

In accordance with the preferred embodiment, the host computer includes a network interface controller (NIC) 95 that couples to the expansion bus 115. Alternatively, the NIC may couple to system bus 84, or to other suitable peripheral buses. As yet another alternative, the functions of the NIC may be implemented in software or integrated into the hardware of the microprocessor. In accordance with normal convention, the NIC 95 couples to the network link 175, which preferably comprises an Ethernet cable. The communications link 175 may also comprise a telephone line, a wireless communications link, or any other suitable communications media. It should also be understood that a combination of different types of communication media may be used to implement communications link 175.

The NIC 95 orchestrates the transfer of data between the host computer system 100 and the network link 175. Thus, in accordance with normal convention and the preferred embodiment, NIC 95 complies with the Ethernet protocol and formats signals on expansion bus 115 to the appropriate format for transmission over the network. The NIC 95 also translates Ethernet signals to the appropriate system bus format and protocol if the host computer system is designated as the destination address. Thus, NIC 95 is designed to comply with the standard Ethernet protocol, which is generally described below.

In accordance with standard Ethernet protocol, data is transmitted in the form of packets, which generally have the layout shown in FIG. 3. The packet begins with a 7-byte preamble that allows receiving stations time to synchronize to the packet. Next, the SFD (start of frame delimiter) is a 1-byte field that can be considered as the last byte of the preamble, in which the final two bits comprise a "11" to denote the start of the message. The next field in the Ethernet packet is the destination address for the packet. In accordance with normal convention, each station on the network has a unique address. To transmit a data packet to a particular target, the destination address of that particular station is used in the packet. The destination address may optionally comprise either a 2-byte or 6-byte field, although a 6-byte field is used in the preferred embodiment. The source address, which may similarly comprise a 2-byte or 6-byte field, identifies the station that is generating the packet. The next field is the length field, which is a 2-byte field that identifies the number of data bytes placed in the data field by the transmitting station. The data field follows the length field. The data field must include at least 46 byte for 6-byte addressing or 54 bytes for 2-byte addressing. If less than the minimum number of bytes are provided in the data field, the source station includes a pad to bring the packet into compliance. Lastly, a 4-byte frame check sequence field is included that provides a cyclic redundancy check.

In addition to providing individual addresses, broadcast packets also may be transmitted on an Ethernet network to all stations on the network, or to a group or sub-set of the stations. A broadcast to all stations is denoted by setting all the bits in the destination address to "1". This is known as the broadcast address. Broadcast messages may also be sent to particular groups within the network. A transmission to an individual address is differentiated from a group address by the status of the first bit in the destination address field. If the first bit of the destination address is set to a "1", this designates a broadcast to a group (or to the entire network). Conversely, if the first bit is a "0", this indicates a single target station is being addressed. In an Ethernet system, all stations receive all packets. Typically, each station includes a network interface controller (NIC) that has a low-level address filter which compares the packet's destination field with the address of the station, and accepts the remainder of the packet if a match occurs. All stations accept the broadcast address, and also are designed to accept broadcast packets to destinations for which they comprise part of the group.

Referring again to FIG. 2, in the preferred embodiment, the management sub-system 140 preferably connects to the host computer system 100 via the system bus 84. The management sub-system 140 may be provided integrally with the computer system 100 on a system board, or may be provided as a plug-in board (as shown in FIG. 1) for connecting to the system bus 84 in accordance with known techniques. The system management sub-system 140 detects failures in the computer system 100 via the system bus and preferably includes the capability to correct some of those failures. As to the failures that cannot be corrected, the management sub-system 140 preferably is capable of isolating the source of the failure to enable the computer system to continue operation, with limited capabilities. In response to an error or failure, the management sub-system 140 preferably transmits an error signal to a systems administrator to initiate error analysis followed in some instances by a system reset. In accordance with the preferred embodiment, the error analysis and reset may be performed remotely.

In the preferred embodiment of the present invention, the management sub-system 140 includes a management processor 150 and management memory 190. Additional components may also be provided in the management sub-system if desired, but those details are omitted herein so as not to unnecessarily complicate this description of the preferred embodiment. According to the preferred embodiment, the processor 150 includes functional blocks including a management NIC 210, a software multiplexer/demultiplexer 165, and management software 170. In the preferred embodiment, these various functional blocks are implemented as software executed by the management processor 150, although any or all of these functional blocks may also be designed as hardware components, either separate from processor 150, or integral with the processor hardware.

The management processor 150 preferably provides information to the host computer system 100 relating to error detection and system administration to reduce the load on the host processor 25. In addition, according to the preferred embodiment, the management processor 150 also functions as a "survival" processor in the event the server processor 25 "hangs" or is rendered inoperable by system error. The management processor 150 thus permits access to the server system 100 for purposes of accessing system components to determine the source of any error. The management processor 150 also preferably detects other system errors and isolates the source of the errors to permit the host computer system 100 to continue operations. The management processor 150 preferably has the same privileges as the host processor 25. Thus, the management processor 150 can reboot the host computer system 100 without accessing the server processor 25. In the event that the management processor 25 is removed from the system bus 84, or the bus fails, the management processor 150 can still operate and communicate with the other devices to which it couples.

The management memory 190 includes random access memory as the working memory of the management processor 150, preferably in the form of dynamic random access memory (DRAM). Other types of memory circuits also may be used such as static random access memory (SRAM) circuits, if desired. In addition, the management memory may also include read-only memory to permanently store code for execution by the management processor. Thus, the management memory 190 is used to store data and code for execution by the management processor 150.

Referring still to FIG. 2, the functional blocks of the management processor 150 now will be described in more detail. In the preferred embodiment the management processor 150 implements the functions of a network interface controller (NIC). As shown in FIG. 2, the management processor 150 includes a network interface controller (NIC) 210, a software multiplexer/demultiplexer 165, and management software 170. The NIC 210 includes decode logic 180 that receives all packets transmitted on the Ethernet link via cable 160. If a packet includes an acceptable destination address, the data packet is passed by decode logic 180 to the multiplexer/demultiplexer 165. In the preferred embodiment, multiplexer/demultiplexer 165 is implemented in software. It should be understood, however, that multiplexer/demultiplexer 165 may also be implemented in hardware, either integral with, or separate from, management processor 150. The management software 170 preferably is stored in permanent memory (such as ROM) and loaded into working memory 190 (such as RAM) when executed by the management processor 150. The management software 170 orchestrates the management operations performed by the management sub-system 140, including monitoring the host system 100, diagnosing problems with the host system, communicating with the remote console regarding management and maintenance operations, and implementing instructions received from the management console. In addition, the management software 170 includes instructions or code that permit the management NIC 210 to be shared by the management sub-system 140 and the host computer system 100. In particular, according to the preferred embodiment, management operations and communications between the host computer system and a remote management console are routed through the management NIC 210, and, in the event that the host NIC 95 fails, some or all of the host computer system's communications with other network devices may be re-routed through the management NIC 210.

The host NIC 95 and the management NIC 210 have separate MAC (medium access control) addresses. In the preferred embodiment of the present invention, the management NIC 210 has two MAC addresses—one for the management sub-system 140, and one for the host computer system 100 (which is virtualized by the management NIC). Thus, the host computer system 100 preferably has two separate MAC addresses on the network—the actual address of host NIC 95, and the virtualized address of the management NIC 210. In accordance With one exemplary embodiment of the invention, management operations to and from the host system 100 are performed using the management NIC 210 in the management sub-system 140. Other standard operations are performed via the host NIC 95. As one skilled in the art will understand, however, other arrangements and partitions of transmissions is possible and may be practiced by one skilled in the art implementing the present disclosure.

According to the preferred embodiment, therefore, the decode logic 180 preferably is configured to accept data packets for at least two MAC addresses. In the most preferred embodiment, the two addresses for the management NIC are identical except for the least significant bit. Consequently, in this preferred embodiment, the decode logic 180 looks at all bits of the address field, except the least significant bit, to determine if the packet targets either of its addresses. Alternatively, the management NIC 210 may have completely different addresses, with decode logic 180 configured to detect these addresses in each patent.

Thus, with respect to packets received from the network, the management NIC 210 accepts addresses directed to either the management sub-system 140, or to the virtualized host system 100. Software running on the management processor 150 (namely, the software multiplexer/demultiplexer 165) examines the destination MAC address of each packet received by the management NIC 210. If the destination MAC address is the address assigned to the management processor, then the multiplexer/demultiplexer 165 gives the packet to the management processor's management software 170. If the destination address is for the "virtual NIC" (i.e., the shared NIC, virtualizing the host computer system), then multiplexer/demultiplexer 165 gives the packet to the host computer at the appropriate time (such as, for example, when the host processor asks for it). In the most preferred embodiment, the multiplexer/demultiplexer 165 examines the least significant bit of the destination address in the network data packet and determines whether to route the packet to the management software 170 or the host processor 25 based on the status of that bit. With respect to outbound signals to be transmitted to the network, the host networking software is responsible for formatting the packet and supplying the necessary fields. Thus, in the preferred embodiment, the OS network driver 30 inserts the virtualized NIC address in outgoing data packets to the network from the host processor 25 that are routed through the management NIC 210 to insure that other stations on the network know the source of the data transmission.

The multiplexer/demultiplexer 165 monitors outgoing packets to determine if any of the outgoing packets include a broadcast address. If a broadcast address is to be transmitted from the host system 100 to the network, multiplexer/demultiplexer 165 intercepts the packet and relays a copy of the packet data to the management software 170. Similarly, if a broadcast was made to a group address by the host system 100, the multiplexer/demultiplexer 165 would examine the address to determine if the management sub-system 140 was part of the targeted group. If so, multiplexer/demultiplexer 165 intercepts the packet and relays a copy of the packet data to the management software 170. In somewhat similar fashion, the multiplexer/demultiplexer 165 would examine transmissions from the management software 170 to determine if the virtualized NIC for the host system was part of the targeted group. If so, multiplexer/demultiplexer 165 intercepts the packet and relays a copy of the packet data to the host processor 25.

If desired, the management NIC 210 may also be used as a back-up or spare for the host system in the event that the host NIC 95 fails, if the management NIC 210 and host NIC 95 are located on the same network. Thus, the OS network driver 30 may be programmed to re-route network assignments from NIC 95 to the management processor 150. In addition, the management NIC 210 may also be used as a spill-over transmission medium for the host system 100 in the event that the host NIC 95 is busy. In this event, the OS network driver may be programmed to re-route certain transmissions from host NIC 95 to the management processor 150. This re-routing may occur automatically, or may be done in response to a command from a system administrator.

While a preferred embodiment of the invention has been shown and described, modifications can be made by one skilled in the art without departing from the spirit of the invention. It should be understood that the principles of the present invention are applicable to any system in which it is desirable to have a computer, workstation or server share a NIC with another device to which it is connected.

What is claimed is:

1. A host computer system capable of coupling to a distributed computer network, comprising:

a host processor;

a host network interface controller coupled to said host processor via a system bus, said host network interface controller is assigned a network address and is capable of connecting to said network to transmit and receive data packets on said network;

a management sub-system including a management network interface controller that couples to said system bus, said management network interface controller capable of coupling to said network to transmit and receive data packets on said network;

wherein said management network interface controller is assigned at least two different network addresses, with one of said addresses comprising the address of the management sub-system, and another of said addresses comprising an address of the host computer system.

2. The system of claim 1, further comprising a management console coupled to said management sub-system via said network.

3. The system of claim 1, wherein management transmissions to and from the host computer system are routed through said management network interface controller.

4. The system of claim 1, wherein said management sub-system includes a management processor that connects between said management network interface controller and to said system bus.

5. The system of claim 4, wherein data transmissions on the network are formatted in packets that include a destination address and a source address, and said management network interface controller includes decode logic that receives transmissions on the network and decodes the destination address of the packet, and wherein said decode logic accepts packets that have a destination address that matches the network address of the management sub-system or host computer system.

6. The system of claim 5, wherein said network address of the management sub-system and the host computer system is different than the address of the host network interface controller.

7. The system of claim 5, wherein the network address of the management sub-system and host computer system are identical except for the least significant bit, and said decode logic examines the destination address of all packets transmitted on said network, but ignores the least significant bit of said destination address.

8. The system of claim 5, wherein said management processor further includes a multiplexer/demultiplexer logic and management software, and wherein said multiplexer/demultiplexer logic receives packets accepted by said decode logic and routes the packets to the management software of the management processor, or routes the packet to the host processor, based on whether the destination address identifies the management sub-system network address or the host computer system network address.

9. The system of claim 7, wherein said management processor further includes a multiplexer/demultiplexer logic and management software, and wherein said multiplexer/ demultiplexer logic receives packets accepted by said decode logic and routes the packets to the management software of the management processor, or routes the packet to the host processor, based on the least significant bit in said destination address.

10. The system of claim 1, wherein said host processor includes an operating system network driver, and said driver is capable of re-routing transmissions to the network from the host network interface controller to the management network interface controller.

11. The system of claim 1, wherein said system bus couples to said host processor through a bus bridge, and said system bus also couples to an expansion bus through a secondary bus bridge, and wherein said host network interface controller connects to said expansion bus.

12. The system of claim 1, wherein said host computer system includes a system board, and said management sub-system is mounted on said system board.

13. A host computer system capable of coupling to a distributed computer network, comprising:
 a host processor;
 a system bus coupling one or more peripheral devices to said host processor;
 a management sub-system including a management network interface controller that couples to said system bus, said management network interface controller capable of coupling to said network to transmit and receive data packets on said network;
 wherein said management network interface controller is assigned at least two different network addresses, with one of said addresses comprising the address of the management sub-system, and another of said addresses comprising an address of the host computer system.

14. The system of claim 13, further comprising a host interface network interface controller coupled to said system bus, and wherein said host network interface controller is assigned a network address different from the network addresses of said management network interface controller.

15. The system of claim 13, wherein data transmissions on the network are formatted in packets that include a destination address and a source address, and said management network interface controller includes decode logic that receives transmissions on the network and decodes the destination address of the packet, and wherein said decode logic accepts packets that have a destination address that matches the network address of the management sub-system or host computer system.

16. The system of claim 15, wherein the network address of the management sub-system and host computer system are identical except for the least significant bit, and said decode logic examines the destination address of all packets transmitted on said network, but ignores the least significant bit of said destination address.

17. The system of claim 15, wherein said management sub-system includes a multiplexer/demultiplexer logic and a management processor executing management software, and wherein said multiplexer/demultiplexer logic receives packets accepted by said decode logic and routes the packets to the management software of the management processor, or routes the packet to the host processor, based on whether the destination address identifies the management sub-system network address or the host computer system network address.

18. The system of claim 16, wherein said management sub-system includes a multiplexer/demultiplexer logic and a management processor executing management software, and wherein said multiplexer/demultiplexer logic receives packets accepted by said decode logic and routes the packets to the management software of the management processor, or routes the packet to the host processor, based on the least significant bit in said destination address.

19. The system of claim 13, further comprising a bus connector coupled to said system bus to permit additional peripheral devices to be plugged into the system bus, and wherein said management sub-system is mounted on a circuit board that connects to said bus connector to permit the management sub-system to monitor the operation and detect failures on said system bus.

20. A computer system capable of coupling to a computer network, comprising:
 means for executing software that coordinates transmissions to and from the computer network;
 means for interfacing said executing means to said computer network, wherein said interfacing means is assigned a first network address, and is capable of connecting to said network to transmit and receive data packets on said computer network;
 means for managing said computer system, said managing means including a means for interfacing said managing means to said network to transmit and receive data packets on said network; and
 wherein said means for interfacing said managing means is assigned at least two different network addresses, with one of the addresses comprising the first network address, and another of said addresses comprising a second network address representing said managing means, thereby enabling said means for interfacing said managing means to transmit and receive data packets on said computer network originating from and targeting both said executing means and said managing means.

21. A computer system as in claim 20, wherein the first network address and the second network address are identical except for the least significant bit, and said means for interfacing said managing means comprises means for decoding that accepts network packets that have a destination address that matches the first or second network address.

22. A computer system as in claim 21, wherein the decoding means routes the packet to the executing means or to the managing means based on the value of the least significant bit of the destination address.

* * * * *